United States Patent
Plantz

(10) Patent No.: US 7,587,835 B2
(45) Date of Patent: Sep. 15, 2009

(54) DEVICE AND A METHOD FOR EXAMINATION OF THE STRAIGHTNESS OF NEEDLES

(75) Inventor: Marianne Plantz, Stockholm (SE)

(73) Assignee: Elekta AB (Publ), Stockholm (SE)

( * ) Notice: Subject to any disclaimer, the term of this patent is extended or adjusted under 35 U.S.C. 154(b) by 185 days.

(21) Appl. No.: 11/582,391

(22) Filed: Oct. 18, 2006

(65) Prior Publication Data

US 2007/0094879 A1 May 3, 2007

(30) Foreign Application Priority Data

Nov. 2, 2005 (SE) .................................. 0502420

(51) Int. Cl.
*G01B 5/25* (2006.01)
*G01N 19/00* (2006.01)
(52) U.S. Cl. ........................................ 33/533; 73/865.9
(58) Field of Classification Search .................. 33/533, 33/549, 550, 412, 520, 644–645, 506; 73/65.01–65.05, 73/865.9
See application file for complete search history.

(56) References Cited

U.S. PATENT DOCUMENTS 3,163,305 A * 12/1964 Stanton ........................ 33/534
3,308,302 A * 3/1967 Fuhrmann et al. ............ 250/224
4,497,207 A * 2/1985 Schaaf ......................... 33/533
5,121,549 A * 6/1992 Gudausky, Jr. ............... 33/533

FOREIGN PATENT DOCUMENTS

DE 338847 C 7/1921
DE 3622313 A1 1/1988

OTHER PUBLICATIONS

Gold Tip Target Arrows "Gold Tip Carbon Target Arrows and Arrow Shafts" Big Horn Outdoors.com (accessed Jan. 8, 2009). (available online Apr. 1, 2005). <http://web.archive.org/web/20050401233632/http://www.above-timberline.com/gold+tip+target+arrows.htm>.*

* cited by examiner

*Primary Examiner*—Lisa M Caputo
*Assistant Examiner*—Jonathan Dunlap
(74) *Attorney, Agent, or Firm*—Buchanan Ingersoll & Rooney PC

(57) ABSTRACT

A device for examination of the straightness of diagnostic and therapeutic needles (11), of the kind which are, with a high grade of accuracy, adapted for selection of samples from, injection of therapeutic preparations into or mounting at target areas positioned deep in tissue. The device has a support (1) in which a needle (11) to be examined is rotatably mountable by means of at least one holding fixture (6), such that the needle being rotatable in the support for allowing examination of the needle in all directions. Also, a method for performing such an examination.

18 Claims, 2 Drawing Sheets

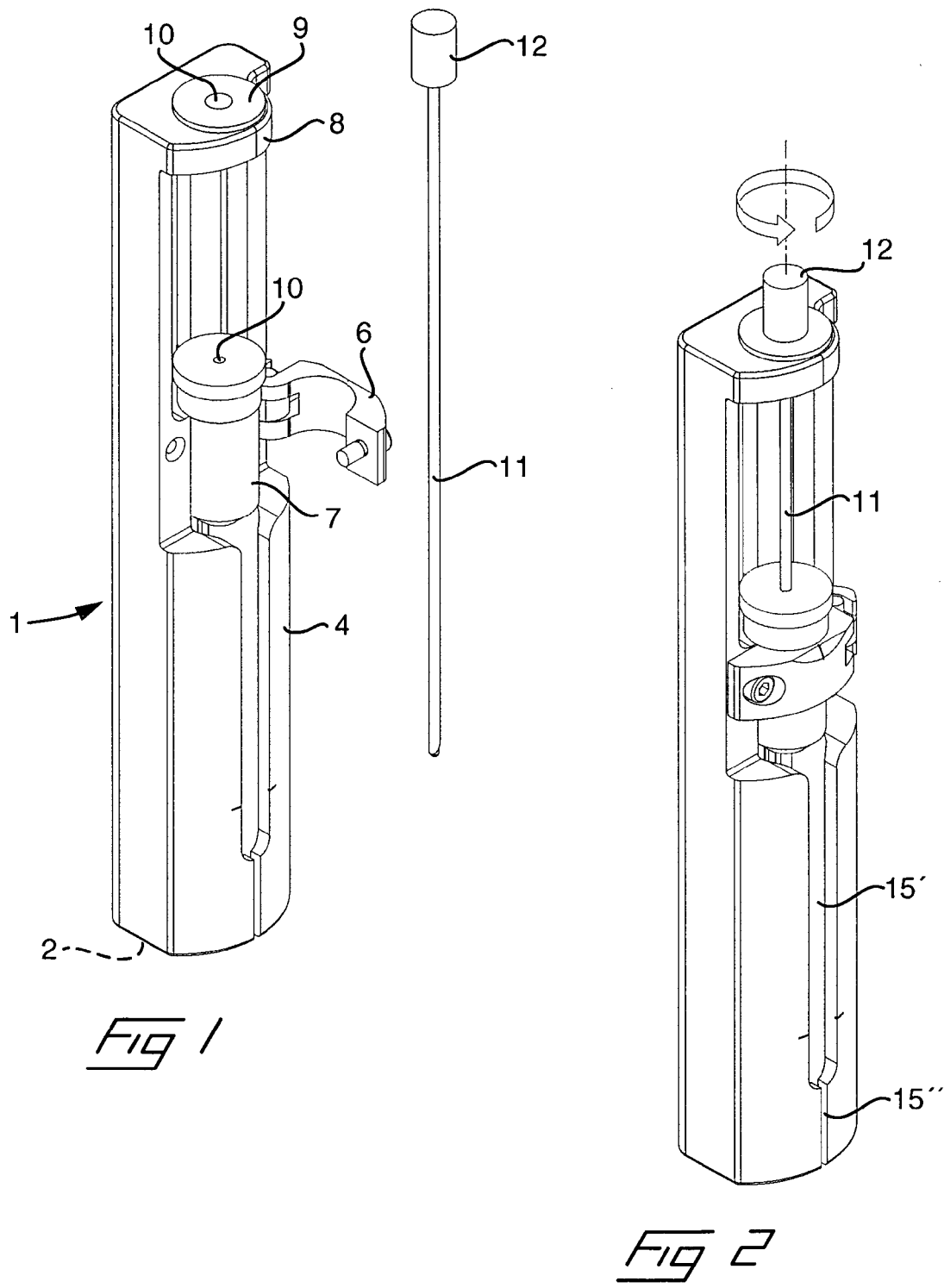

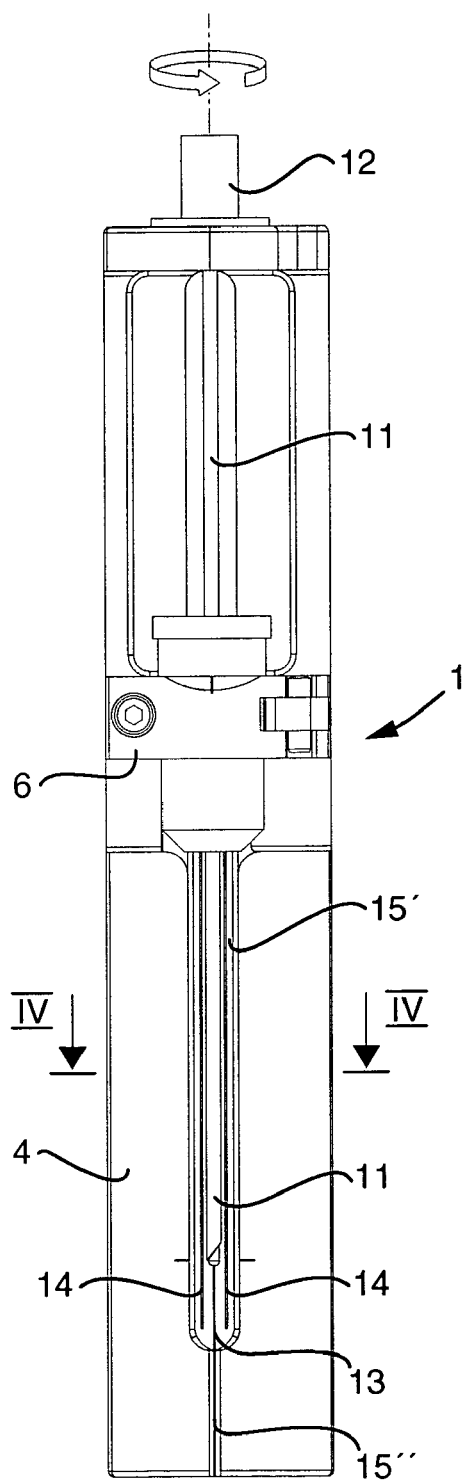
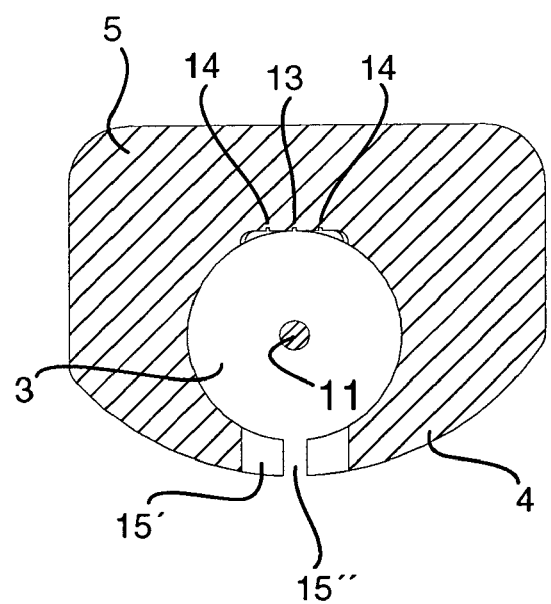
Fig 3
Fig 4

DEVICE AND A METHOD FOR EXAMINATION OF THE STRAIGHTNESS OF NEEDLES

The present invention relates to a device for examination of the straightness of diagnostic and therapeutic needles, of the kind which are, with a high grade of accuracy, adapted for selection of samples from, injection of therapeutic preparations into or mounting at target areas positioned deep in tissue.

The invention also relates to a method for performing such examination.

BACKGROUND OF THE INVENTION

The most common way today for examining the straightness of needles of the above kind, is to roll the needles on a flat plate of metal or stone. By viewing the needle close to and in parallel to the upper surface of the plate while rolling the needle by hand and comparing it with the flat surface, it is tried to locate the position of the needle which exhibit the largest deviation from straightness. When that position is found one has to make a purely subjective estimation of if the viewed deviation is acceptable or not without any aid from any instruments or other facilities. A needle of this kind normally has a width in a range within 8-0.8 mm and the acceptable deviation from straightness may be as small as approximately 0.3 mm. This method is extra difficult to perform while the needle has to be viewed in close parallelism to the plate surface, which makes minor deviations hard to detect.

This situation is not satisfactory in view of the fact that these needles are adapted to perform, in many cases highly critical, diagnostic and therapeutic measures with high precision deep inside tissue. One area of the human body, and probably the most common, where such measures often are performed, is in the brain. After image scanning of the head, a medical-practitioner might find an area which exhibit abnormal changes and it is decided to take a tissue sample of that area. For this reason a hole is drilled through the scull and a biopsy needle is introduced into the target area in the brain. If the biopsy needle should have a curvature, it is an obvious risk that the needle misses the target area and takes a sample from a healthy area instead. Accordingly, the patient may be erroneously declared healthy. Mistakes may also be made, for similar reasons, when performing lesions or stimulations, by means of electrodes, or chemotherapy by means of injection needles of target areas, maybe having to effect that measurements are performed of and injections made into a wrong area if the electrode and the injection needle, respectively, has an unacceptable curvature.

Moreover, when using the needles in practice, they usually are securely attached to a holding structure, preferably a semicircular guide arc fastened to a so called stereotactic frame secured to the scull. For best guidance of the needle, it is common practice to use a guide member attached to the holding structure, which will guide the needle as close as possible to the scull when introducing it into the brain. To examine the straightness of the needle without it being guided by the guide member, will not reflect the actual deviation from straightness under use.

Furthermore, when rolling the needle on the plate surface, the needle has to be touched by hands, which is unfavourable for two reasons. On the one hand, the contact with the needle may affect the straightness of the needle, in case it concerns needles of small dimensions anyway. On the other hand, the contact of the hands with the needle as well as the contact between the needle and the plate surface, will contaminate the needle which excludes the possibility to perform the examination under sterilized conditions just before use of the needle.

SUMMARY OF THE INVENTION

The present invention aims at eliminating problems and disadvantages associated with prior art for examining the straightness of diagnostic and therapeutic needles. More precisely, the object of the invention is to provide a device for examination of diagnostic and therapeutic needles, by which it is possible to perform the examination with high precision and under sterilized conditions. At least this object is achieved by a device according to claim 1 and 8.

The invention also relates to a method for performing such examination, having essentially the same object as above. This object is achieved by a method according to claim 9.

The invention is thus based on the understanding that the above object may be achieved by a device comprising a support, in which the needle is securely but rotatably mountable, and by comparing the deviation from straightness of the needle in different directions by viewing the needle while at the same time rotate it. In this way it is possible to readily and reliably find the direction in which the needle has its largest deviation from straightness, and by which it is facilitated to estimate if a possible detected deviation is acceptable.

Within the scope of the invention as defined in claims 1 or 9, it is possible to implement the device in different ways. For example, the device could be formed without any form of marker for comparing with the needle when rotating it. In such a case the estimation of the straightness or the acceptable curvature is based totally on an estimation of the eccentricity of the needle when rotated.

However, in a preferred embodiment, the device is equipped with some kind of marker for comparing with the needle. The marker may be designed in various ways. In a hereinafter described and in the drawings illustrated embodiment of the invention, the support is provided with a straight marker line in parallel to the needle. However, the marker could also be in form of a pointed member, which meets the tip of the needle with a small distance from beneath, or in form of a measuring scale, located immediately beneath the tip of the needle or "behind" the needle as viewed by the user, the scale being directed perpendicularly to the extension of the needle.

When comparing the needle with a straight marker line in parallel to the needle, as in the preferred embodiment, it is advisable to provide some kind of means to ensure viewing of the needle in a plane containing an imaginary line which a straight needle would follow when mounted in the device. This may be accomplished in different ways. In the hereinafter described embodiment of the invention, it is accomplished by forming the device with an internal cavity having at least a rear wall and a front wall. The straight marker line is provided in the rear wall, while the front wall is formed with a slot, which serves as a sighting notch when viewing the needle, which is positioned in the cavity during the examination. However, several other means could fulfill this function as well, for example a transparent plate having one or more marker lines and being positioned in front of the needle.

To further facilitate the examination of the needle, and especially to enable detection of also very small deviations, the device according to the preferred embodiment is provided with more than one straight marker line. More precisely are three parallel marker lines provided, of which a middle marker line is positioned in the sight plane, whereas two outer marker lines are provided on each side of the middle one. In this way it is possible to detect small deviations even if the deviation is so small that the needle completely covers the middle marker line in any rotary position of the needle.

To imitate the actual situation as when using the needle, provisions are made, in a preferred embodiment of the invention, for enabling mounting of also a guide member for the needle in the support, which will guide the needle at substantially the same level as in actual use. The guide member may preferably be the same as used together with the needle when mounted in the support. This is an advantage when performing the examination under sterilized conditions just before use of the needle, since both the needle and the guide member may be sterilized while no equipment being part of the device need to be sterilized. However, the guide member may also be a separate, supplementary part of the device itself. This may be advantageous if the actual guide members that is used has different external forms and sizes, which could make the mounting in the support difficult. By letting the guide member be part of the device, it is possible to have a few guide members with different sizes of the internal bores for different sizes of needles, but having the same external size and form suitable for mounting in the device. However, to perform the examination under sterilized conditions, this has to effect that also the guide member of the device has to be sterilized.

In an actual diagnostic or therapeutic situation, the needle is usually guided also by a stop member, which is mounted in the holding structure in a suitable location to define a limit for the penetration of the needle into the tissue. In a preferred embodiment of the invention, provisions are made for enabling mounting of also a stop member for the needle in the support, which will define a limit for the maximum displacement of the needle in its longitudinal direction. As with the guide member, as discussed above, the stop member may be the same as used together with the needle when mounted in the support, or it may be a part of the device itself. In analogue fashion, the same advantages and disadvantages apply also here, i.e. using the same stop member as at actual use is advantageous in terms of performing the examination under sterilized conditions, whereas using a supplementary stop member is advantageous in terms of avoiding mounting problems when using different kinds of stop members.

It would however be possible to, instead of enable use of separate and exchangeable guide and stop members, provide a device having several mounting positions, each including one bore serving as a guide member and one bore serving as a stop member, and possible also some kind of marker, e.g. marker lines, for each mounting position. The pair of bores could, in such case, each has different bore diameters to fit needles of different sizes.

It is obvious for a person skilled in the art, that the invention is applicable in many different ways within the scope of the appended claims. For example, the device may be adapted to mount the needles in any desired orientation and not only in a vertical direction, as disclosed in the exemplary embodiment, as the needles usually are so light weight that gravity has no significant influence on the deviation. Hence, the needles could also be mounted and examined in e.g. a horizontal direction.

BRIEF DESCRIPTION OF THE DRAWINGS

The invention will hereinafter be described in form of an exemplary embodiment with reference to the accompanying drawings, in which:

FIG. 1 is a perspective view of the device and a needle, to be examined, separated from the device;

FIG. 2 is a perspective view corresponding to FIG. 1 with the needle in a mounted state;

FIG. 3 is a front view of the device in FIG. 2; and

FIG. 4 is a cross section, in an enlarged scale, through the device and needle along the line IV-IV in FIG. 3.

DETAILED DESCRIPTION OF A PREFERRED EMBODIMENT

Referring to FIGS. 1-4 of the drawings, the device according to the invention, comprises an elongated support or body 1, which is adapted primarily to be positioned in an upright or vertical position with a bottom side 2 located against an underlying structure. However, the device can also be hand-held or located in a horizontal position during the examination.

A lower portion of the support is formed with an internal bore or cavity 3 in the longitudinal direction, as is best seen in FIG. 4, having essentially a circular-cross section and a front wall 4 as well as a rear wall 5. In an upper portion, on the contrary, the support is formed with an open cross section having no front wall but only a rear wall. Instead, the support is in a position slightly above the middle of the support, provided with a mounting means in form of a hinged clamp member 6 for holding of a guide member 7. In an upper end, the support is provided with a flange portion 8 having a through hole (not shown) in which a stop member 9 may be inserted from above. The guide member and the stop member have similar shapes with a circular cross section and an upper flange portion, the guide member 7 being best seen in FIG. 1. Both the guide member and the stop member are provided with a through bore 10 in the longitudinal direction, respectively, for receiving a needle 11.

In FIG. 1, the device is shown with the stop member 9 mounted and the guide member 7 in position but not yet clamped since the clamp member 6 is in an open state. The needle is not yet positioned and therefore shown separated from the device. In FIG. 2, the clamp member 6 is closed and locked, and the needle is inserted through the bores 10 until a knob 12 at a proximal end of the needle abuts the stop member 9. The knob 12 of the needle may have various forms depending on the type of needle, and serves as a mounting member for mounting to additional equipment under use, e.g. a syringe in case of an injection needle. The device is now in condition for examination of the straightness of the needle. For a detailed explanation of the examination procedure and the specific features of the device for enabling the examination, reference is made primarily to FIGS. 3 and 4 in combination.

As is apparent from FIG. 3, the device is provided with three straight marker lines in the rear wall 5. More precisely, the lines are parallel to the needle and comprises one middle marker line 13 and two outer marker lines 14. The middle marker line 13 is longer than the outer marker lines and extends essentially all the way down to the bottom of the device. The marker lines are etched into rear wall 5 of the cavity 3 and therefore also indicated in FIG. 4.

The front wall 4 is provided with a through slot in parallel to the needle 11 and the marker lines 13, 14, the slot being divided into a wide upper slot portion 15' and a narrow lower slot portion 15". The wide slot portion 15' and the outer marker lines 14 are terminated in essentially the same region.

An examination of the straightness of a needle by means of the device, is performed in the following principal way. With the needle mounted in the device, as illustrated in FIG. 3, the needle 11 is rotated by rotating the knob 12 by hand in either direction, as indicated by the arrow. Simultaneously, the user is viewing the needle through the wide slot 15'. The slot will serve as a sighting notch to ensure viewing of the needle in a plane containing the middle marker line 13 and an imaginary line which a straight needle would follow when mounted in the device. This can be done by checking that the two outer marker lines 14 are centred between the edges of the wide slot 15'. However, the user can also look through the narrow lower slot 15", and if the long middle marker line is visible through the narrow slot, the user can be assured that the sighting direction is correct. When the correct sighting direction is adopted, all three marker lines 13, 14 will be visible through the wide slot 15'. If the needle has a curvature, it will look as if it is swinging to and frog when viewing it under simultaneously rotation. In this way it is easy to see not only if the tip of the needle has a deviation and is swinging, but also if there is a curvature higher up on the needle though the tip of the needle do not exhibit any deviation. Hence, it is easy to find the direction of the largest deviation from straightness and it is also easy to estimate the amount of the deviation since the distance between the marker lines 13 and 14 is known or can readily be measured.

I claim:

1. A device for examination of the straightness of diagnostic and therapeutic needles, comprising:
   a support comprising a first portion and a second portion;
   at least one holding fixture in the first position of the support, the at least one holding fixture adapted for rotatably mounting of a needle to be examined; and
   at least one marker located in the second portion of the support,
   wherein the device is adapted such that a needle to be examined for straightness is, with a needle portion remote from a tip of the needle, rotatably mountable in the holding fixture of the support, such that the needle is suspended from the holding fixture by the needle portion remote from the tip, while a needle portion located closest to the tip of the needle is free and comparable in all directions with the marker during rotation of the needle for determining whether the needle is straight or whether a possible curvature of the needle is acceptable or not.

2. A device according to claim 1, wherein said marker is a straight line which is parallel to the needle in its intended mounting position.

3. A device according to claim 2, wherein the support comprises not only one first, straight marker line, but also two additional, straight marker lines on each side of the first marker line and in parallel to the same.

4. A device according to claim 1, wherein the marker comprises a pointed member, which meets the tip of the needle with a small distance from beneath.

5. A device according to claim 1, wherein a guide member, designed for the needle, is mountable in the support for holding of the needle.

6. A device according to claim 1, wherein a stop member, designed for the needle, is mountable in the support for holding of the needle.

7. The device according to claim 1, wherein the device is adapted for the examination of a needle that has a width of 0.8 to 8 mm.

8. The device according to claim 1, wherein the device is adapted for the examination of a deviation from straightness as small as 0.3 mm.

9. A method for examination of the straightness of diagnostic and therapeutic needles, comprising the steps of:
   mounting a needle to be examined in a support by rotatably mounting a portion of the needle remote from a tip of the needle to at least one holding fixture of a first portion of the support, while leaving a needle portion closest to the tip of the needle free;
   rotating the needle in the support for allowing examination of the needle in all directions; and
   comparing the position of the needle portion closest to the tip in relation to a marker in a second portion of the support for determining whether the needle is straight or whether a possible curvature of the needle is acceptable or not.

10. A method according to claim 9, wherein the comparing step comprises comparing the needle portion closest to the tip with a straight marker line in the second portion of the support, which is parallel to the intended mounting position of the needle.

11. A method according to claim 10, wherein the comparing step comprises the needle portion closest to the tip not only with one first, straight marker line, but also with two additional straight marker lines on each side of the first marker line and being parallel to the same.

12. A method according to claim 10, wherein the comparing step comprises viewing the needle portion closest to the tip by examination through a slot in a wall portion in front of the needle portion closest to the tip and comparing the needle portion closest to the tip with a straight marker line in a wall portion behind the needle portion closest to the tip.

13. A method according to claim 9, wherein the comparing step comprises comparing the needle portion closest to the tip with a pointed member, which meets the tip of the needle with a small distance from beneath.

14. A method according to claim 9, wherein the mounting step comprises mounting the needle in the support together with a guide member designed for the needle.

15. A method according to claim 9, wherein the mounting step comprises mounting the needle in the support together with a stop member designed for the needle.

16. The method according to claim 9, wherein the needle being examined has a width of 0.8 to 8 mm.

17. The method according to claim 9, wherein the method is adapted for the examination of a deviation from straightness as small as 0.3 mm.

18. A device for examination of the straightness of diagnostic and therapeutic needles, comprising a support in which a needle to be examined is rotatably mountable, at a portion remote from the tip of the needle, and that the support is formed with an internal cavity, through which the needle, in a mounted state, is adapted to be extended and which is defined by a front wall and a rear wall, wherein the rear wall comprises a straight marker line in parallel to the intended longitudinal extension of the needle in the mounted state, while the front wall is formed with an elongated slot, which is in parallel to the straight marker line, such that the needle is visible through the slot for comparing with the marker line.

* * * * *